(12) United States Patent
Hattori et al.

(10) Patent No.: US 7,571,792 B2
(45) Date of Patent: Aug. 11, 2009

(54) BRAKE BAND

(75) Inventors: Kazumi Hattori, Fukuroi (JP);
Yoshihisa Egawa, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 543 days.

(21) Appl. No.: 11/293,221

(22) Filed: Dec. 5, 2005

(65) Prior Publication Data

US 2006/0081424 A1  Apr. 20, 2006

(30) Foreign Application Priority Data

Dec. 10, 2004  (JP) .............................. 2004-358435

(51) Int. Cl.
*F16D 51/00* (2006.01)

(52) U.S. Cl. ...................... 188/77 W; 192/80

(58) Field of Classification Search .............. 188/77 W, 188/77 R, 83, 257, 250 B; 192/80, 107 T
See application file for complete search history.

(56) References Cited

U.S. PATENT DOCUMENTS

| | | | | |
|---|---|---|---|---|
| 1,529,828 A | * | 3/1925 | Barlow ........................ | 188/259 |
| 5,135,082 A | * | 8/1992 | Umezawa et al. ........ | 188/77 W |
| 5,238,091 A | * | 8/1993 | Nakagawa et al. ....... | 188/77 W |
| 5,335,765 A | * | 8/1994 | Takakura et al. ......... | 192/107 R |
| 5,467,849 A | * | 11/1995 | Nakagomi et al. ....... | 188/77 W |
| 6,401,878 B1 | * | 6/2002 | Harada et al. ............. | 188/77 R |
| 6,971,487 B2 | * | 12/2005 | Okada ...................... | 188/77 W |
| 7,219,774 B2 | * | 5/2007 | Fujii et al. ................ | 188/77 W |
| 2002/0189912 A1 | * | 12/2002 | Landa et al. ............... | 188/259 |

FOREIGN PATENT DOCUMENTS

| | | |
|---|---|---|
| JP | 63-135031 U | 9/1988 |
| JP | 5-47559 U | 6/1993 |
| JP | 8-14285 A * | 1/1996 |

* cited by examiner

*Primary Examiner*—Pam Rodriguez
(74) *Attorney, Agent, or Firm*—Miles & Stockbridge P.C.

(57) ABSTRACT

The present invention provides a brake band in which brackets are joined to both ends of a curved strap and a friction material is fixed to an inner side of the curved strap and wherein a dynamic pressure generating groove is formed in the friction material only at an area of the friction material which is positioned at an upper part along a vertical direction in a condition that the brake band is attached to an automatic transmission.

13 Claims, 4 Drawing Sheets

BRAKE BAND

BACKGROUND OF THE INVENTION

1. Field of the Invention

The present invention relates to a brake band used in an automatic transmission of, for example, a motor vehicle. More particularly, the present invention relates to a brake band in which a friction plate to be attached to a strap is provided with a groove.

2. Related Background Art

In general, a brake band comprises an annular strap cut transversely at one location, brackets provided on cut ends the strap and a friction material secured to an inner peripheral surface of the strap and is designed so that so that the strap is tightened against a drum by applying a force to the apply side bracket by means of an apply pin, thereby obtaining a braking force.

Japanese Utility Model Application Laid-open No. 05-047559 discloses a brake band in which a lining disposed on an inner periphery of a strap is provided with a groove to prevent transmission shock during the braking. Further, Japanese Utility Model Application Laid-open No. 63-135031 (1988) discloses a brake band in which a plurality of grooves extending in a circumferential direction are formed in a lining disposed on an inner peripheral surface of a strap, at an apply portion and/or an anchor portion or through the whole circumferential direction.

In general, in an attachment condition in which the loading of an anchor pin directs from an upward direction to a downward direction upon releasing the brake band, during an idle rotation in a normal direction, by the dropping of the brake band due to its own weight and by self winding (mechanical property of the brake band) toward an anchor side, the brake band tends to be pulled toward a rotational direction. Thus, clearance between an upper part of a drum and the brake band is decreased to a maximum extent, and drag torque reaches a peak value at or around 2000 rpm under various conditions. As a result, the great dragging torque acts on the band drum and the drag torque is increased under a high rotational condition that occurs most frequently due to the performance of the band, effect of automatic transmission and reduction of a fuel consumption rate are required. Further, regarding the above explanation, this is also true when the drum is rotated in a reverse direction in an attachment condition in which the loading of the anchor pin directs from the downward direction to the upward direction.

In order to solve such problems, there have been proposed techniques in which the groove(s) is/are provided in the lining or friction material as disclosed in the above-mentioned Japanese Utility Model Application Laid-open No. 05-047559 and Japanese Utility Model Application Laid-open No. 63-135031. However, in these patent documents, the groove(s) is/are provided in the friction material through the whole circumferential direction or at the apply portion and/or anchor portion.

For example, when the grooves are provided through the whole circumferential direction of the strap, it is feared that the dropping of the band cannot be suppressed completely.

SUMMARY OF THE INVENTION

Accordingly, an object of the present invention is to provide a brake band in which, by adding a dynamic pressure generating groove to a friction material at a position where the brake band is contacted with a drum, in an attachment condition that the loading of an anchor pin directs from an upward direction to a downward direction, the dropping of the band can be suppressed and drag torque can be reduced by generating dynamic pressure due to viscosity of oil in a normal rotational direction. This is also true when the drum is rotated in a reverse direction in an attachment condition that the loading of the anchor pin directs from the downward direction to the upward direction.

To achieve the above object, the present invention provides a brake band in which brackets are joined to both ends of a curved strap and a friction material is fixed to an inner side of the curved strap and wherein a dynamic pressure generating groove is formed in the friction material only at an area of the friction material which is positioned at an upper part along a vertical direction in a condition that the brake band is attached to an automatic transmission.

According to the present invention, the following effect can be obtained.

That is to say, by forming the dynamic pressure generating groove (for generating dynamic pressure in a predetermined rotational direction of the drum) in the friction material only at the area of the friction material which is positioned at the upper part along the vertical direction in the condition that the brake band is attached to the automatic transmission, the dynamic pressure due to the viscosity of the oil in the rotational direction is generated, thereby suppressing the dropping of the band and reducing the drag torque.

DESCRIPTION OF THE PREFERRED EMBODIMENTS

Figure 1:
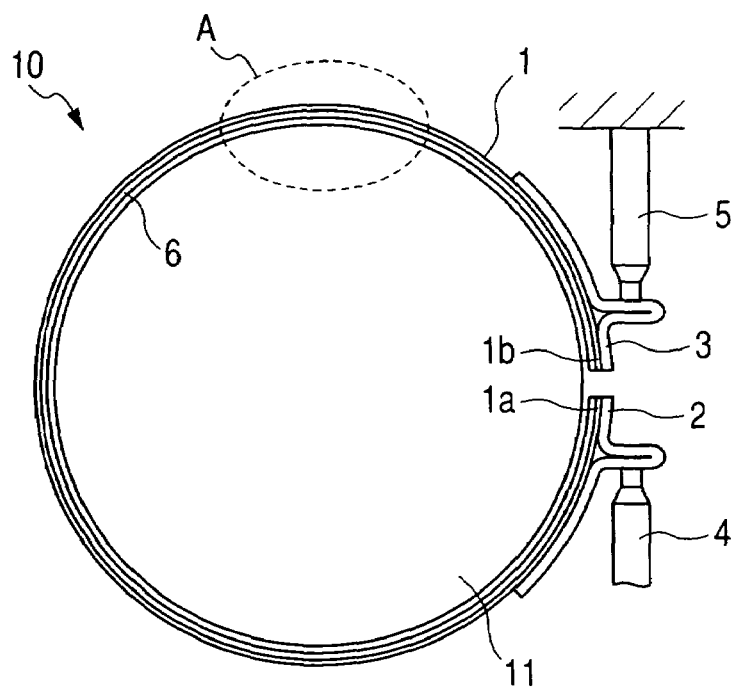
FIG. 1 is a front view of a brake band according to an embodiment of the present invention.

Now, the present invention will be fully explained with reference to the accompanying drawings. Incidentally, it should be noted that embodiments described later are merely exemplary and do not intend to limit the present invention. Further, in the drawings, the same parts or elements are designated by the same reference numerals.

FIG. 1 is a front view of a brake band 10 according to an embodiment of the present invention. The brake band 10 comprises a substantially annular strap 1 formed from thin steel pate, an apply side bracket 2 joined to an end 1a of the strap 1, and an anchor side bracket 3 joined to the other end 1b of the bracket 1. A friction material 6 is stuck on an inner surface of the strap 1 by an adhesive or the like. A drum 11 of an automatic transmission (not shown) is fitted within the strap 1. The apply side bracket 2 and the anchor side bracket 3 have the same shape but may have different shapes.

The anchor side bracket 3 is associated with an anchor pin 5 so that the end 1b of the strap 1 is maintained in a fixed condition. Further, an apply pin 4 driven by a drive mechanism (not shown) abuts against the apply side bracket 2. The apply pin 4 flexes the strap 1 by urging the apply side bracket 2 to tighten the strap against an outer peripheral surface of the drum 11 so that the ends 1a and 1b of the strap 1 approaches each other, thereby generating a braking force.

A surface of the friction material 6 which is opposed to the outer peripheral surface of the drum 11 is provided with a special groove. This groove is formed in an area A of the friction material positioned at an upper part in a vertical direction in a condition that the brake band is attached to the automatic transmission (not shown). With this arrangement, dynamic pressure caused by viscosity of oil in a normal rotational direction can be generated efficiently, with the result that the dropping of the strap 1 or brake band due to its own weight can be suppressed and drag torque can be reduced.

Now, examples of the groove formed in the friction material 6 will be described. Each of FIGS. 2 to 8 shows the groove formed in the friction material 6 of the brake band 10 according to respective embodiments of the present invention. As shown in FIGS. 2 to 8, the friction material 6 is provided with circumferential grooves 12 disposed equidistantly along a circumferential direction. Each groove 12 serves as a lubricating oil reservoir. Further, the arrow B shows the anchor side.

Figure 2:
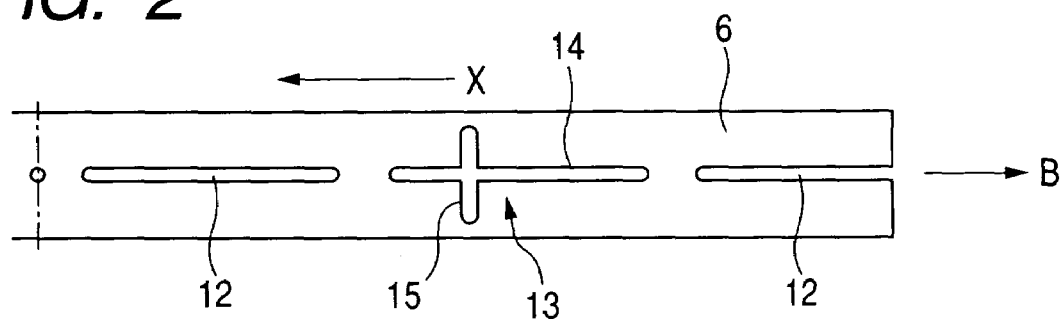
FIG. 2 is a front view showing an example of a groove formed in a friction material.

In FIG. 2, a dynamic pressure generating groove 13 is provided in the friction material at a position corresponding to the area A of FIG. 1 between the grooves 12. The groove 13 comprises a circumferential groove portion 14 and an axial groove portion 15 transverse to the groove portion 14. Mainly, the dynamic pressure is generated by the groove portion 15.

Figure 3:
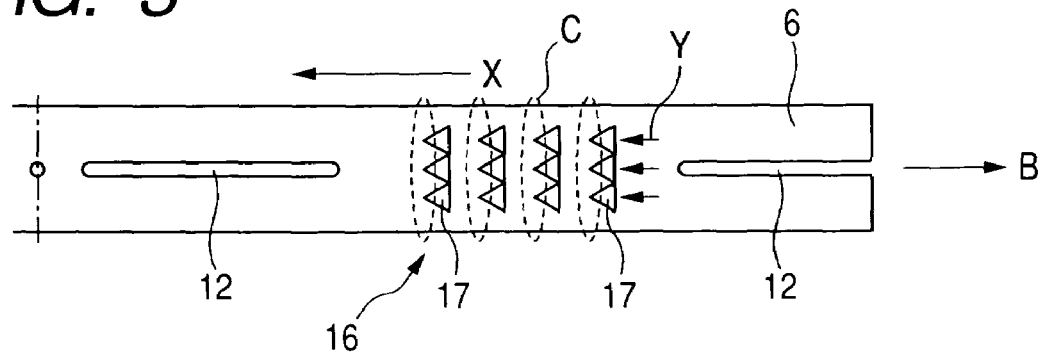
FIG. 3 is a front view showing an example of a groove formed in a friction material.

In FIG. 3, a dynamic pressure generating groove 16 is constituted by four segments each of which includes three triangular groove portions 17 arranged in an axial direction. In this case, an apex of each triangular groove portion 17 is directed toward a rotational direction X of the drum 11 and a flowing direction Y of the oil or lubricating oil. In FIG. 3, in each area C shown by the broken line, the lubricating oil is interrupted, and the interrupted lubricating oil generates the dynamic pressure for floating the strap 1 from the drum 11.

Figure 4:
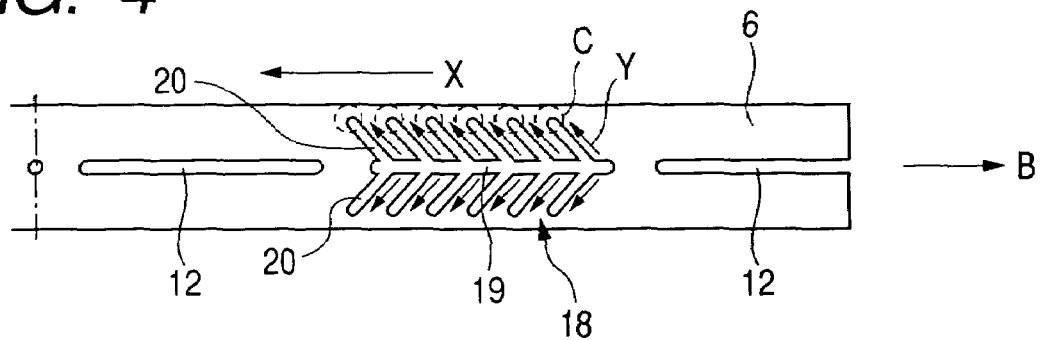
FIG. 4 is a front view showing an example of a groove formed in a friction material.

FIG. 4 shows another example of the dynamic pressure generating groove. The dynamic pressure generating groove 18 is constituted by a central groove portion 19 extending in the circumferential direction, and a plurality of branched straight groove portions 20 extending in the axial direction from both sides of the central groove portion 19. In this example, the areas C for interrupting the lubricating oil are formed at distal ends of the branched straight groove portions 20.

Figure 5:
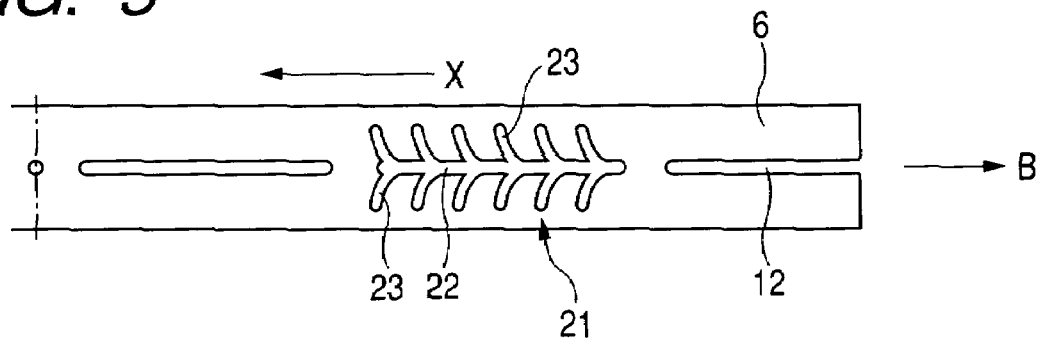
FIG. 5 is a front view showing an example of a groove formed in a friction material.

FIG. 5 shows a further example of the dynamic pressure generating groove. The dynamic pressure generating groove 21 is constituted by a central groove portion 22 extending in the circumferential direction, and a plurality of branched curved groove portions 23 extending in the axial direction from both sides of the central groove portion 22. In this example, the areas for interrupting the lubricating oil are formed at distal ends of the branched curved groove portions 23.

Figure 6:
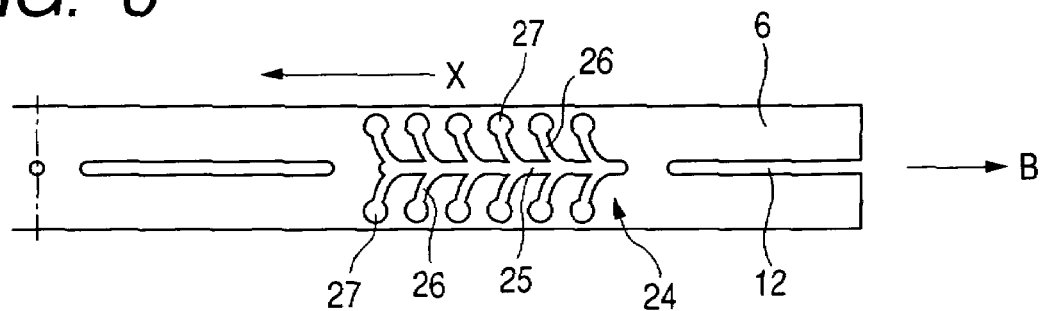
FIG. 6 is a front view showing an example of a groove formed in a friction material.

FIG. 6 shows a still further example of the dynamic pressure generating groove. The dynamic pressure generating groove 24 is constituted by a central groove portion 25 extending in the circumferential direction, and a plurality of branched curved groove portions 26 extending in the axial direction from both sides of the central groove portion 25. In this example, the areas for interrupting the lubricating oil are formed at distal ends of the branched curved groove portions 26. In this case, the distal end 27 of each curved groove portion 26 differs from those shown in FIGS. 4 and 5 and is widened more than the remaining portion and is formed as a circular region in this example. Accordingly, the effect for interrupting the lubricating oil is increased more than the other groove portions.

Figure 7:
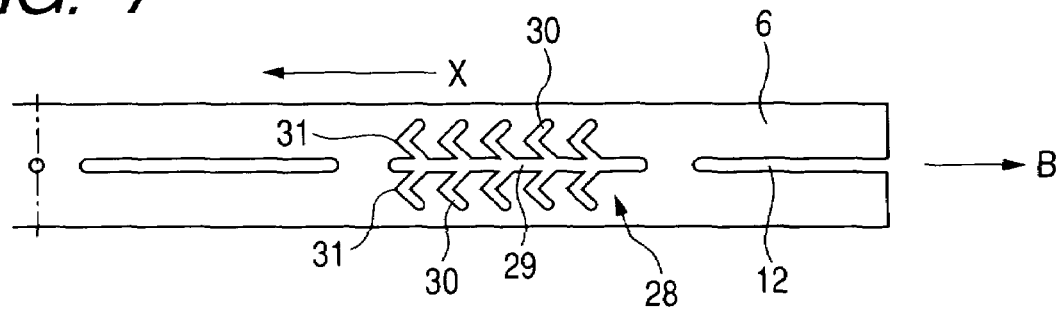
FIG. 7 is a front view showing an example of a groove formed in a friction material.

FIG. 7 shows another example of the dynamic pressure generating groove. The dynamic pressure generating groove 28 is constituted by a central groove portion 29 extending in the circumferential direction, and a plurality of branched bent groove portions 30 extending in the axial direction from both sides of the central groove portion 29. In this example, the areas for interrupting the lubricating oil are formed at bent portions 31 of the branched bent groove portions 30.

Figure 8:
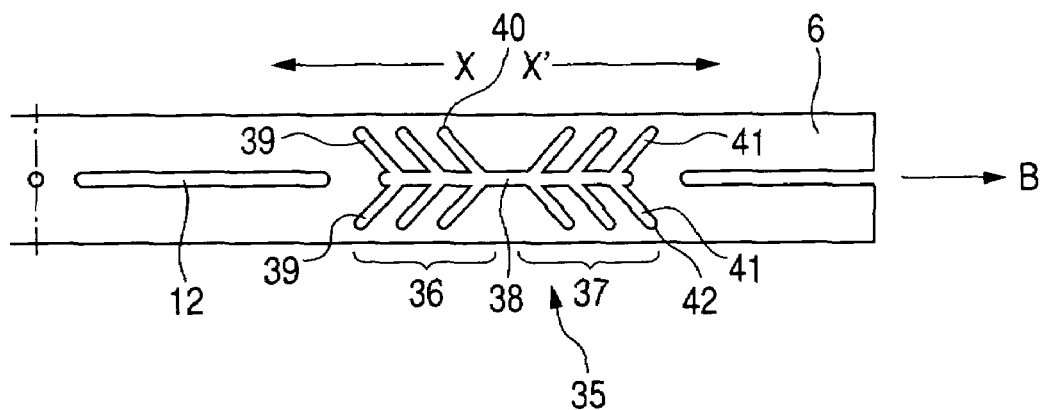
FIG. 8 is a front view showing an example of a groove formed in a friction material.

FIG. 8 shows a further example of the dynamic pressure generating groove. The dynamic pressure generating groove 35 is constituted by a central groove portion 38 extending in the circumferential direction, and a plurality of branched bent groove portions 39 and 41 extending in the axial direction from both sides of the central groove portion 38. In this example, the areas for interrupting the lubricating oil are formed at closed distal ends 40 and 42 of the branched bent groove portions 39 and 41.

In the example shown in FIG. 8, the dynamic pressure generating groove 35 includes two groove groups 36 and 37 divided into two in the circumferential direction. The groove group 36 includes the bent groove portions 39 and the groove group 37 includes the bent groove portions 41. The example of FIG. 8 is characterized in that the desired dynamic pressure can be generated even when the drum 11 is rotated in the normal direction or in a reverse direction.

That is to say, if it is assumed that the normal rotational direction is a direction shown by the arrow X in FIG. 8, when drum 11 is rotated in the normal direction, the groove portions 39 mainly generate the dynamic pressure; whereas, when the drum 11 is rotated in a reverse direction X', the groove portions 41 generate the dynamic pressure. This design permits the generation of the dynamic pressure even if the drum 11 is rotated in either of normal and reverse directions.

Figure 9:
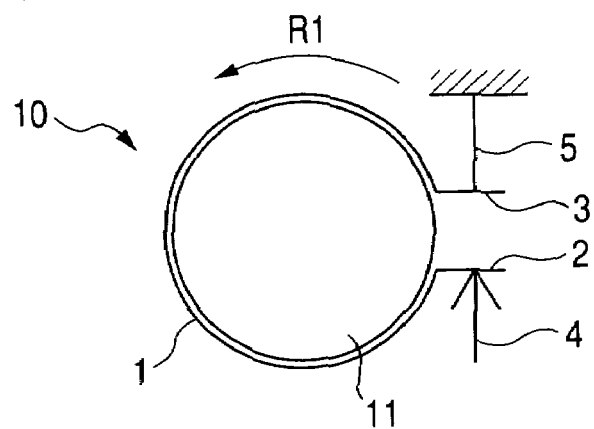
FIG. 9 is a schematic view showing an example of a relative relationship between an attaching direction of the brake band and a rotational direction of a drum.
Figure 10:
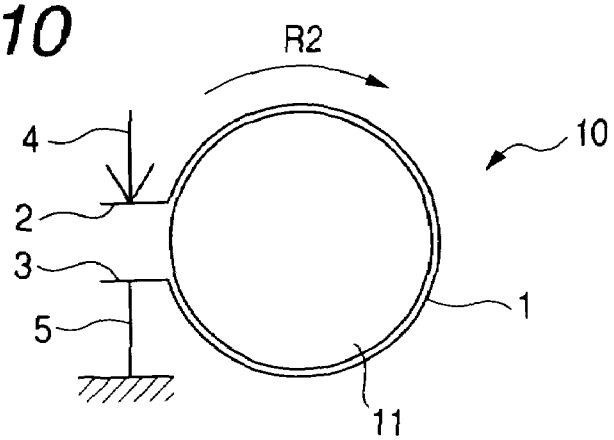
FIG. 10 is a schematic view showing another example of a relative relationship between an attaching direction of the brake band and a rotational direction of a drum.

FIGS. 9 and 10 are schematic views showing examples of a relative relationship between the attaching direction of the brake band 10 and the rotational direction of the drum 11. In FIG. 9, the drum 11 is rotated in the normal direction R1, and the apply pin 4 urges the bracket from the below. On the other hand, in FIG. 10, the drum 11 is rotated in the reverse direction R2, and the apply pin 4 urges the bracket from the above.

Further, in FIGS. 1, 9 and 10, although examples that the apply pin 4 and the anchor pin 5 are aligned with each other in the vertical direction were explained, the present invention is not necessarily limited to such embodiments, but, these pins may be attached at an angle with respect to the vertical direction, i.e. may be attached obliquely.

Each of the above-mentioned dynamic pressure generating grooves can be formed in the friction material 6 by the press working. Alternatively, the dynamic pressure generating groove may be formed simultaneously with the blanking of the friction material 6. Further, the groove pattern is not limited to the illustrated groove pattern, but, for example, the triangular groove portion shown in FIG. 3 may be changed to any one of other polygonal groove patterns or to circular or elliptical groove pattern. Further, in the groove patterns shown in FIGS. 2 and 4 to 8, although the groove pattern includes the branched groove portions branched from the central groove portion, the central groove portion may be omitted and the groove pattern may be constituted by discrete branched groove portions alone. In any cases, it is preferable that the groove pattern has the effect capable of interrupting the lubricating oil.

Figure 11:
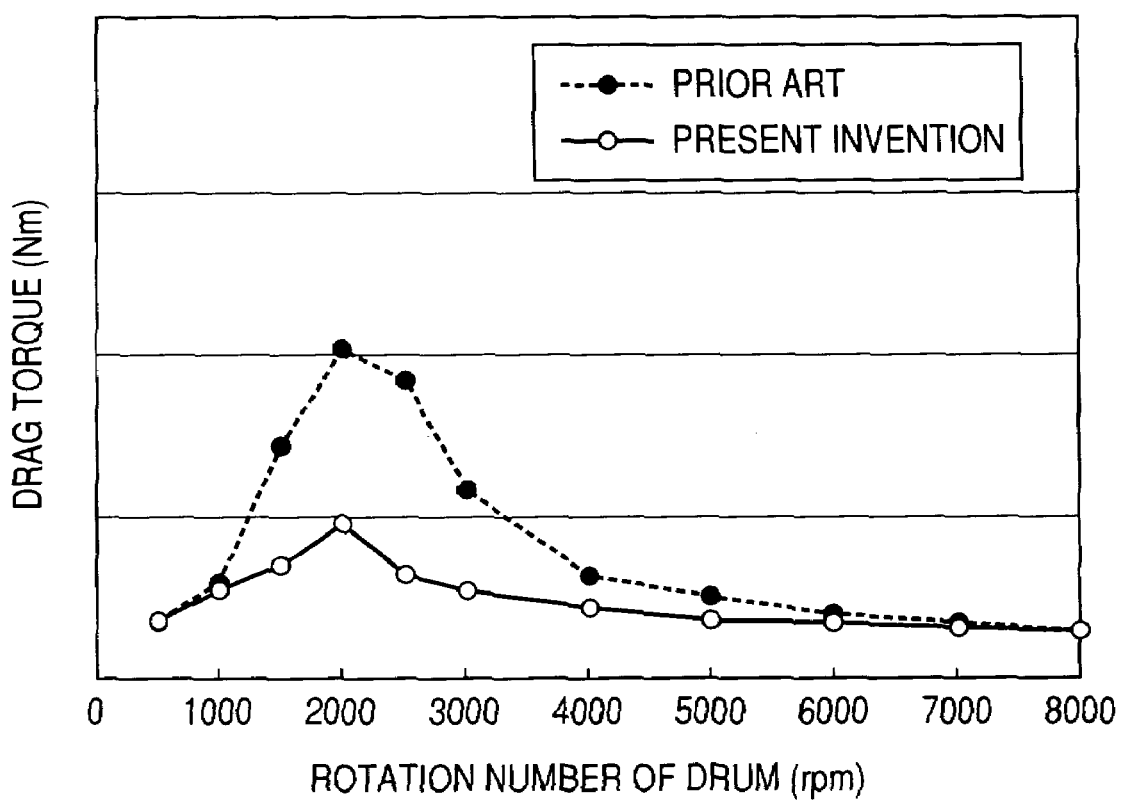
FIG. 11 is a graph showing a difference in effect between the present invention and the prior art.

A difference in effect between the present invention and the prior art is shown in a graph of FIG. 11. Under various conditions, it can be seen that, in the present invention, the drag torque having a peak value when the drum is rotated at or around 2000 rpm is reduced by about 50% in comparison with the prior art. Further, it can be seen that the drag torque in the present invention is reduced in comparison with the prior art during other rotation number of drum.

This application claims priority from Japanese Patent Application No. 2004-358435 filed on Dec. 10, 2004, which is hereby incorporated by reference herein.

What is claimed is:

1. A brake band in which brackets are joined to both ends of a curved strap and a friction material is fixed to an inner side of the curved strap, wherein:

a dynamic pressure generating groove is formed in said friction material only in a predetermined area of said friction material, the dynamic pressure generating groove being configured and disposed such that, when the brake band is mounted on a drum of a transmission system with said predetermined area being disposed adjacent to a top surface portion of the drum, the dynamic pressure generating groove generates a dynamic pressure that opposes a gravitational force acting on the brake band to suppress dropping of the brake band toward the top surface portion of the drum.

2. A brake band according to claim 1, wherein, in an attachment condition in which a loading force provided by an anchor pin acting on one of the brackets of the brake band is directed downward, said dynamic pressure during a normal rotation of the drum is generated only at said predetermined area positioned adjacent to the top surface portion of the drum.

3. A brake band according to claim 1, wherein, in an attachment condition in which a loading force provided by an anchor pin acting on one of the brackets of the brake band is directed upward, said dynamic pressure during a reverse rotation of the drum is generated only at said predetermined area positioned adjacent to the top surface portion of the drum.

4. A brake band according to claim 1, wherein said dynamic pressure generating groove is configured such that said dynamic pressure is generated both when said drum is rotated in a normal direction and when said drum is rotated in a reverse direction.

5. A brake band according to claim 1, wherein said dynamic pressure generating groove includes polygonal groove portions.

6. A brake band according to claim 5, wherein said dynamic pressure generating groove does not extend to both ends of said curved strap.

7. A brake band according to claim 1, wherein said dynamic pressure generating groove includes a central groove portion, which extends in a circumferential direction at a substantially central position of said friction material, and a plurality of groove portions branched from said central groove portion.

8. A brake band according to claim 7, wherein said dynamic pressure generating groove does not extend to both ends of said curved strap.

9. A brake band according to claim 1, wherein said dynamic pressure generating groove is formed by press working or punching of said friction material.

10. A braking apparatus comprising:

a rotary drum; and a curved brake band with a friction material on an inner surface thereof, the friction material having a pressure generating groove formed only in a predetermined area of the friction material, the brake band being wrapped around the rotary drum such that the predetermined area is disposed adjacent to a top surface portion of the rotary drum, wherein the pressure generating groove is configured and disposed so as to generate a dynamic pressure that opposes a gravitational force acting on the brake band to suppress dropping of the brake band toward the top surface portion of the rotary drum.

11. The braking apparatus of claim 10, wherein the predetermined area has a plurality of the pressure generating grooves.

12. The braking apparatus of claim 10, wherein grooves that generate dynamic pressure are only formed in said predetermined area disposed adjacent to the top surface portion of the rotary drum.

13. The braking apparatus of claim 10, wherein the pressure generating groove includes polygonal groove portions.

* * * * *